United States Patent [19]

Augustin

[11] Patent Number: 4,824,341
[45] Date of Patent: Apr. 25, 1989

[54] HELIX-CONTROLLED DIRECT FUEL INJECTION PUMP

[75] Inventor: Ulrich Augustin, Kernen, Fed. Rep. of Germany

[73] Assignee: Daimler-Benz Aktiengesellschaft, Stuttgart, Fed. Rep. of Germany

[21] Appl. No.: 116,889

[22] Filed: Nov. 5, 1987

[30] Foreign Application Priority Data

Nov. 27, 1986 [DE] Fed. Rep. of Germany ....... 3640460

[51] Int. Cl.$^4$ ............................................. F02M 45/06
[52] U.S. Cl. .................................................. 417/499
[58] Field of Search ................ 417/494, 499; 123/500, 123/501, 504, 506, 299, 300

[56] References Cited

U.S. PATENT DOCUMENTS

| 2,565,681 | 8/1951 | Fleck et al. | |
| 2,713,310 | 7/1955 | Muraszew | |
| 2,831,433 | 4/1958 | Seifert et al. | 417/494 |
| 3,435,811 | 4/1969 | Guertler | 123/506 |

FOREIGN PATENT DOCUMENTS

| 948209 | 8/1956 | Fed. Rep. of Germany | |
| 1253952 | 11/1967 | Fed. Rep. of Germany | |
| 2922426 | 11/1980 | Fed. Rep. of Germany | |
| 421818 | 1/1935 | United Kingdom | 417/494 |
| 423030 | 1/1935 | United Kingdom | 417/494 |
| 529813 | 11/1940 | United Kingdom | 417/494 |

OTHER PUBLICATIONS

"Erprobung eines Einspritzsystems mit Gleichdruckentlastung für Fahrzeugdiesel Motoren", Dr.-Ing. Ferenc Anisits und Ing. (grad) Gernot Amann, Arbon/Schweiz, MTZ Motortechnische Zeitschrift 38 (1977) 4, pp. 131-132.

*Primary Examiner*—Leonard E. Smith
*Attorney, Agent, or Firm*—Barnes & Thornburg

[57] ABSTRACT

The invention relates to a helix-controlled fuel injection pump intended for commercial vehicle internal combustion engines, with a constant-pressure relief valve and with a cam-operated pump piston, which controls a fuel bore hole in the pump cylinder, opening into the pump working space and at the same time serving for fuel supply, by an upper control edge for initiation of the injection and which controls this fuel bore hole by a lower helical control edge for ending of the injection and which furthermore controls a recess in the pump cylinder connecting the pump working space and the fuel bore hole by a peripheral groove for interruption of the injection.

6 Claims, 2 Drawing Sheets

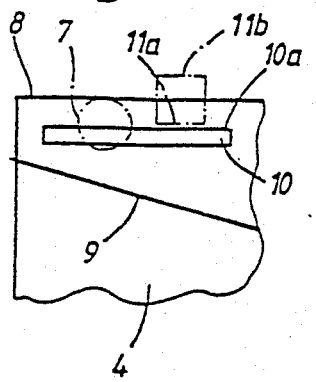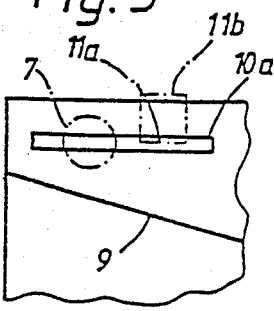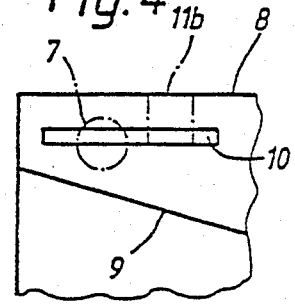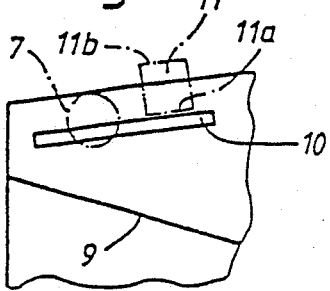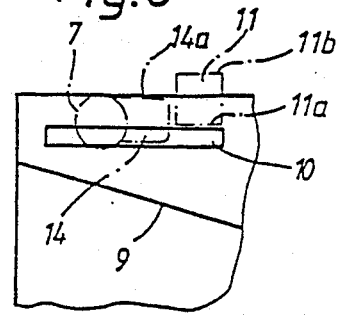

HELIX-CONTROLLED DIRECT FUEL INJECTION PUMP

BACKGROUND AND SUMMARY OF THE INVENTION

The invention relates to a helix-controlled fuel injection pump for internal combustion engines, in particular direct injection engine for commercial vehicles of tee type having a piston pump cylinder with control edges for controlling the supply of fuel to a pump working space via a fuel bore through the pump cylinder.

German patent specification No. 1,253,952 discloses a fuel injection pump in which, as well as a main injection piston, a further piston is used, which is intended for a pre-injection and the control collar of which controls the end of pre-injection. This fuel injection pump requires a not inconsiderable constructional effort and an overall height which is extended by the pre-injection piston and the spring arrangement.

An object of the invention is to simplify the fuel injection pump of the type mentioned above in terms of its technical construction and taking into account a compact overall height and of ensuring that the interruption in the injection produced by the control means is not impaired and thus contributes to noise reduction.

This object is achieved according to the invention by providing that the pump working space is bounded by a constant pressure relief valve and the pump piston, wherein the pump piston has an upper control edge and a lower helical control edge for controlling the fuel injection in dependance on the position of the pump piston and pump cylinder, wherein the pump cylinder is provided with a recess and the pump piston is provided with a peripheral groove for controlling pre-injection.

Providing the injection pump with a constant-pressure relief valve instead of an otherwise customary constant-volume relief valve has the advantage that the pressure lines leading to the injection nozzle are always completely filled with fuel. This consequently prevents the formation of voids or harmful spaces which do not allow for a complete interruption of the injection between the pre-injection and main injection phases.

The type of control means provided for effecting pre-injection, namely merely a recess in the pump cylinder and a peripheral groove on the pump piston with respective control edges, provides the possibility of controlling the pre-injection according to the requirements of the internal combustion engine, even load-dependently.

A further particular advantage achieved with the invention is that a functionally extremely effective pre-injection is achieved with the simplest of control means.

The measures as a whole greatly reduce troublesome harsh combustion noises.

The particular profile of the control edges relative to each other and the assignment of the peripheral groove on the one hand to the fuel bore hole and on the other hand to the recess allow for a rapid controlled opening and closing and thus an exact injection quantity characteristic effecting a strict separation between pre-injection and main injection according to certain especially preferred embodiments of the invention.

Further advantageous features of especially preferred embodiments make it possible, with a corresponding groove geometry, to effect the fuel interruption at any point. For example, to throttle the fuel interruption load-dependently, the cross-section of the peripheral groove is made smaller in the direction of partial load. Other measures serve to maintain substantially the pre-injection quantity, in spite of controlled pre-injection commencement, while other features influence the pre-injection quantity via the load.

In certain preferred embodiments an additional recess as peripheral groove in the cylinder for abrupt cutoff, for the purpose of introduction of pre-injection, reduces the dynamic component of the delivery rate in pre-injection, with the result that there is a reduction in the pre-injection quantity.

Other objects, advantages and novel features of the present invention will become apparent from the following detailed description of the invention when considered in conjunction with the accompanying drawings.

BRIEF DESCRIPTION OF THE DRAWINGS

FIG. 2 is a schematic projection of the pump control edges showing the pump piston in a position introducing pre-injection;

FIG. 3 is a view similar to FIG. 2 which shows the pump piston in a position interrupting fuel delivery;

FIG. 4 is a view similar to FIG. 2 which shows the pump Piston in a position introducing main injection; and FIGS. 5 and 6 are views similar to FIG. 2 depicting other embodiments with control edges for influencing pre-injection.

DETAILED DESCRIPTION OF THE DRAWINGS

Figure 1:
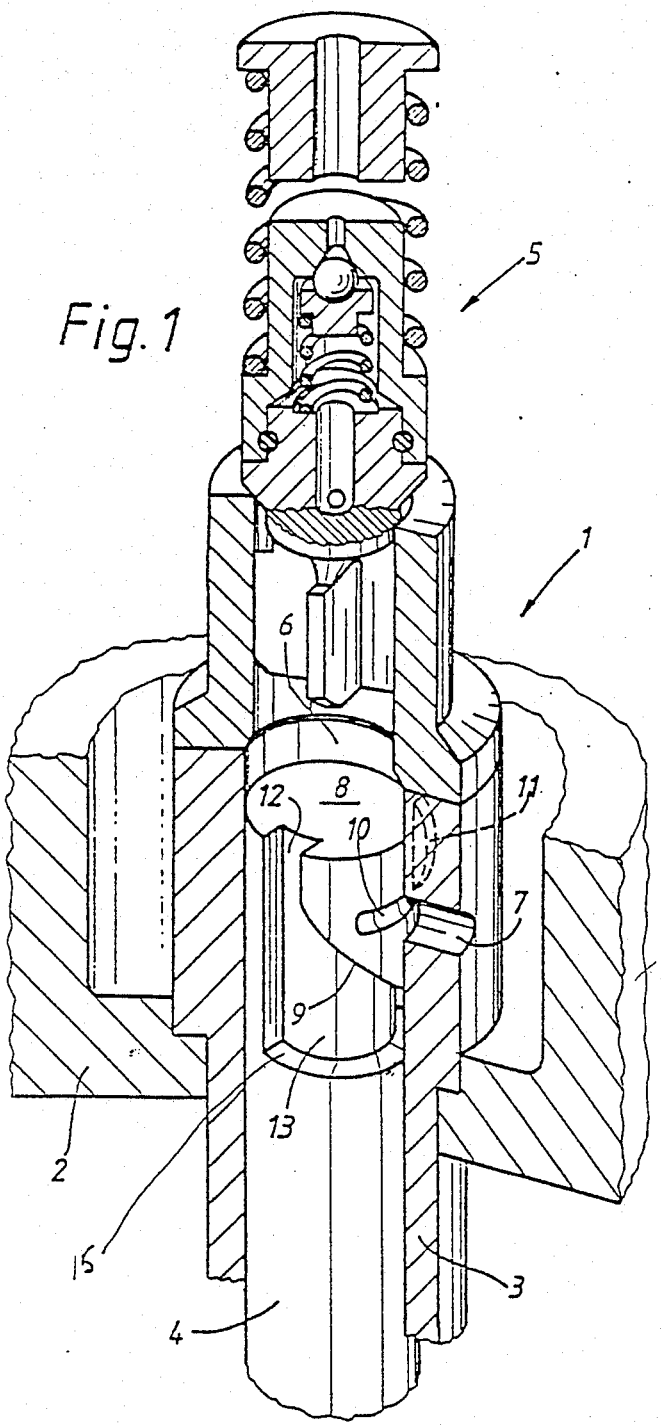
FIG. 1 is a longitudinal sectional view through the pump element of a helix-controlled injection pump constructed in accordance with a preferred embodiment of the invention.

FIG. 1 shows a pump element 1 of a helix-controlled fuel injection pump 2 for air-compression injection internal combustion engines, preferably of a commercial vehicle direct injection engine. A pump piston 4 guided axially and rotationally in the pump cylinder 3 and a constant-pressure relief valve 5 bound a pump working space 6, which is filled with fuel at bottom dead center of the pump piston 4 via a fuel bore hole 7 arranged in the pump cylinder 3.

The pump piston 4 has an upper straight control edge 8 for introduction of the injection and a lower helical control edge 9 for ending of the injection. Between the two control edges 8, 9 there is a peripheral groove 10, which connects the fuel bore hole 7 to a recess 11 made in the pump cylinder 3, for the purpose of interruption of the injection. The recess 11, which has a rectangular opening cross-section, extends half into the pump working space 6 and half into the pump piston 4. A longitudinal groove 12 in the pump piston 4 connects the pump working space 6 to a recessed piston part 13 lying underneath the helical control edge 9.

In each of FIGS. 2, 3 and 4, the pump piston 4 provided with an upper control edge 8 is shown rolled out or projected flat to depict the control edges. The associated fuel bore hole 7 and recess 11 are indicated by dot-dashed lines. The peripheral groove 10 has an upper straight control edge 10a, which runs parallel to the lower straight counter control edge 11a of the recess 11 and, in the position shown in FIG. 2 for controlled cutoff of the fuel bore hole 7, lies at a small distance from the counter-control edge 11a. The recess 11 extends half into the pump working space 6 and half into the pump piston 4. At the same time, the peripheral groove 10 overlaps the fuel bore hole 7.

In FIG. 3, the delivery of the pre-injection quantity is ended by the connection of the peripheral groove 10 to the recess 11 and the fuel bore hole 7, while the upper control edge 11b of the recess 11 lies above the upper control edge 8 of the pump piston 4 and the lower counter-control edge 11a lies in the peripheral groove 10. In the position shown, the greatest overlapping cross-section between the fuel bore hole 7 and the peripheral groove 10 is produced.

Overlapping cross-section are formed between the counter-control edge and the control edge of the peripheral groove and between an upper control edge of the recess and the upper control edge of the pump piston having at least approximately the same cross-sectional area in a delivery stroke position in which the largest overlapping cross-section exists between the cutoff bore hole and the peripheral groove.

In FIG. 4, the delivery of the main injection quantity commences, while the connection between the pump working space 6 and the recess 11 is interrupted. The end of main injection is controlled by the lower helical control edge 9 on the pump piston 4.

The upper helical control edge 8 according to FIG. 5 makes it possible for the commencement of pre-injection delivery to be controlled. The peripheral groove 10 and the recess 11 display a correspondingly adapted helical profile.

In the case of the exemplary embodiments mentioned above, the fuel bore hole is cut off merely for the introduction of pre-injection. Since the opening cross-section of the fuel bore hole decreases only gradually in controlled cutoff, an additional recess 14 (FIG. 6) may be provided in the pump cylinder 3 for reduction of the dynamic delivery up to the commencement of static delivery, which recess is designed as a peripheral groove and is connected to the fuel bore hole 7 in such a way that the upper edge 14a of the peripheral groove 14 forms a tangent to the fuel bore hole 7 in its upper part. The peripheral groove 14 ends at a distance from the recess 11 and does not enter into a connection with the latter over the entire control path.

All of the exemplary embodiments concern single-flow designs with a lower helical control edge on the pump piston and with two opposite fuel bore holes; however, double-flow designs with two control edges can also be used according to certain preferred embodiments, although only one stop groove can be provided instead of the usual two stop grooves, in order to ensure the accommodation and the interaction of the peripheral groove 10 and the recess 11. With double-flow pump elements, a steeper drop of the end of delivery can be achieved.

A combination of the pump elements according to the invention with spray-hole nozzles free from blind holes proves to be particularly suitable.

For reasons of space and/or for production reasons, the peripheral groove 10 made in the pump piston and the recess 11 in the pump cylinder may be positioned further down in the pump element 1 (not shown) i.e. the peripheral groove 10 may be provided underneath the lower edge 15 of the pump piston 4, the recess 11 and a further fuel bore hole having to be assigned correspondingly. The fuel bore hole 7 would continue to be responsible for the end of main injection delivery.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. Helix-controlled fuel injection pump for internal combustion engines, in particular direct injection engines for commercial vehicles, with a relief valve, with a cam-operated pump piston, which is guided axially and rotationally in a pump cylinder and controls a cutoff bore hole in the pump cylinder, serving to supply fuel into the pump working space, by an upper control edge for initiation of the injection (pre-injection phase) and by a lower helical control edge for ending of the injection (main injection phase), furthermore with first and second recesses made in the pump cylinder, the second recess being constantly connected to the fuel bore hole and running parallel to the upper control edge of the pump piston, and a peripheral groove on the pump piston having an upper control edge, the peripheral groove connecting the first recess and the cutoff bore hole, for interruption of the injection, the first recess and the cutoff bore hole being arranged—seen in circumferential direction of the pump cylinder—one behind the other in such a way that, while the peripheral groove overlaps with the cutoff bore hole, the recess at the same time establishes a connection with the peripheral groove corresponding to the end pre-injection, wherein the relief valve is designed as a constant-pressure relief valve and wherein the first and second recesses arranged in the pump cylinder each have a rectangular opening cross-section, the upper edge of the second recess forming a tangent to the fuel bore hole and the first recess having a lower counter-control edge running parallel to the control edge of the peripheral groove on the pump piston, overlapping cross-sections formed between the counter-control edge and the control edge of the peripheral groove and between an upper control edge of the recess and the upper control edge of the pump piston having at least approximately the same cross-sectional area in a delivery stroke position in which the largest overlapping cross-section exists between the cutoff bore hole and the peripheral groove.

2. Fuel injection pump according to claim 1 wherein the upper control edge of the pump piston is helically designed and forms an acute angle with the lower helical control edge and in that each of the two control edges of the first recess arranged in the pump cylinder and of the peripheral groove arranged in the pump piston runs in parallel to the upper helical control edge of the pump piston.

3. Fuel injection pump according to claim 1, wherein the second recess is designed as a peripheral groove which, in the direction of full load, extends almost up to the first recess.

4. Fuel injection pump arrangement for direct injection internal combustion engines, comprising:
a pump cylinder,
a pump piston movably guided in the pump cylinder,
and a constant pressure relief valve facing the pump piston to form a working space in the pump cylinder, said piston and cylinder being configured such that the working space is filled with fuel via a fuel bore in the pump cylinder at the bottom dead center position of the pump piston, wherein the pump piston has an upper control edge and a lower helical control edge for controlling the fuel injection in dependence on the position of the pump piston and pump cylinder, wherein the pump cylinder is provided with a first recess and the pump piston is provided with a peripheral groove for controlling pre-injection of fuel supplied via the fuel bore to the working space in dependence on the position of the pump piston and pump cylinder, the first recess having a rectangular opening cross-section with a lower counter-control edge extending parallel to a control edge of the peripheral groove, and the overlapping cross-sections formed between the counter-control edge and the peripheral groove control edge and between the upper control edge of the first recess and of the upper control edge of the pump piston having approximately the same cross-sectional area in a delivery stroke position in which the largest overlapping cross-section exists between the fuel bore and the peripheral groove, and wherein a second rectangular recess, constantly connected to the fuel bore hole and running parallel to the upper control edge of the pump piston, is provided in the pump cylinder, the upper edge of the second recess forming a tangent to the fuel bore hole.

5. Fuel injection pump according to claim 4, wherein the upper control edge of the pump piston is helically designed and forms an acute angle with the lower helical control edge and in that each of the two control edges of the first recess arranged in the pump cylinder and of the peripheral groove arranged in the pump piston runs in parallel to the upper helical control edge of the pump piston.

6. Fuel injection pump according to claim 4, wherein the second recess is designed as a peripheral groove which, in the direction of full load, extends almost up to the first recess.

* * * * *